(12) United States Patent
Sage

(10) Patent No.: US 6,196,587 B1
(45) Date of Patent: Mar. 6, 2001

(54) TOW SHIELD AND UNDERSKIRT DEVICE

(75) Inventor: William L. Sage, Rogers, AR (US)

(73) Assignee: Assembled Products Corporation, Rogers, AR (US)

( * ) Notice: Subject to any disclaimer, the term of this patent is extended or adjusted under 35 U.S.C. 154(b) by 0 days.

(21) Appl. No.: 09/260,912

(22) Filed: Mar. 2, 1999

(51) Int. Cl.[7] .............................. B60R 9/02; B65D 65/02
(52) U.S. Cl. ............................................ 280/770; 150/166
(58) Field of Search .................................. 280/155, 768, 280/770; 150/166; 296/178, 180.1

(56) References Cited

U.S. PATENT DOCUMENTS

| | | | |
|---|---|---|---|
| 2,097,923 | * 11/1937 | Hutchinson | 150/166 |
| 4,041,999 | 8/1977 | Miller . | |
| 4,138,130 | 2/1979 | Pickrell et al. . | |
| 4,157,200 | 6/1979 | Johnson . | |
| 4,639,027 | 1/1987 | Boyd . | |
| 4,706,991 | 11/1987 | Miller . | |
| 4,840,400 | 6/1989 | Greenleaf . | |
| 4,936,599 | 6/1990 | McNamee . | |
| 5,181,734 | 1/1993 | Brown . | |
| 5,350,184 | 9/1994 | Hull et al. . | |
| 5,480,174 | 1/1996 | Grenier . | |
| 5,609,350 | * 3/1997 | Chumley et al. | 280/476.1 |
| 5,762,374 | 6/1998 | Grove et al. . | |
| 5,829,775 | * 11/1998 | Maxwell et al. | 280/770 |
| 6,022,038 | * 2/2000 | Maxwell et al. | 280/770 |

\* cited by examiner

*Primary Examiner*—Brian L. Johnson
*Assistant Examiner*—Joselynn Sliteris
(74) *Attorney, Agent, or Firm*—Boyd D. Cox

(57) ABSTRACT

The tow shield and underskirt device comprises a flexible deflecting member that is adapted to be attached to the towing vehicle and the vehicle in tow to protect both vehicles and the tow bar from road debris that is thrown by moving vehicles during travel. Tensioned elastic members on the forward and rearward edges of the deflecting member hold the respective edges adjacent to the rear of the towing vehicle and adjacent to the front of the towed vehicle. The longitudinal sides of the deflecting member are supported by additional elastic members which lengthen and shorten as the vehicles maneuver around corners.

22 Claims, 5 Drawing Sheets

TOW SHIELD AND UNDERSKIRT DEVICE

BACKGROUND

The present invention is a tow shield and underskirt device for protecting both a towed vehicle and the towing vehicle from deflected road debris and more particularly to a universally sized tow shield device that can be removably attached to the rear of the towing vehicle and the front of the towed vehicle.

It is common to tow a vehicle, such as a car or trailer, from one location to another by pulling it behind a leading vehicle. In the towing process, debris, including rocks, roadside trash, mud, snow, water, salt, tar, grease, oil, engine exhaust, diesel soot and hydraulic fluid, is generally deflected from the towing/leading vehicle toward the towed/trailing vehicle, subjecting the towed vehicle to possible damage.

With an increase in the number of large recreational vehicles (RV's) in use, towing problems have recently gained more attention. RV travelers frequently tow a smaller vehicle behind their RV to use for local transportation. When reaching a destination, typically the RV is parked and hooked up to utilities, while the smaller vehicle is unhitched and prepared for use.

On long trips, these vehicles spend a great deal of time in-tow, where marring and costly damage can occur. The towing vehicle and tow bar can also incur costly damage from the deflected debris.

Not only can deflected dirt and debris cause damage to both vehicles, but they can also create layers of road grime on the exposed surfaces of the vehicles, making it necessary to continually clean the vehicles over the course of a trip. When traveling, such measures can be inconvenient and are most certain to be always unwelcome.

It is not uncommon for RV travelers to hitch and unhitch the smaller, towed vehicle on a frequent basis. Therefore, a heavy or bulky deflector that requires a time-consuming removal/installation process can frustrate the user and ultimately discourage unhitching of the towed vehicle for local use.

Furthermore, the cumbersome nature of many rigid deflectors can contribute to the difficulty of storing the tow bar and the deflector. In most campgrounds and RV parks, space is at a premium. As a result, the length of an available parking space may be limited. To fit into a shorter space, it is often necessary to uncouple the tow bar which can then be conveniently stored by sliding it under the rear of the RV. A rigid deflector mounted on the tow bar can impede this convenient storing arrangement.

Many deflectors adapted for attachment to the tow bar have a reduced effectiveness when the trailing vehicle is not directly aligned with the leading vehicle, such as when turning a corner or driving on a curved road. In these instances, a reduced portion of the trailing vehicle remains positioned behind the deflector, and as a result, only a portion of the road debris being thrown toward the towed vehicle is intercepted by the deflector. Consequently, deflectors can fail to adequately deflect flying debris away from the vehicle in tow when driving around corners and curves.

In addition, rigid deflectors can interfere with the turning radius between the towing vehicle and the towed vehicle. When turning, a deflector adapted to move with the towed vehicle and not the towing vehicle can abut the towing vehicle, thereby limiting the radius of the turn. Similarly, a deflector mounted to move with the towing vehicle, and not the trailing vehicle, can abut the towed vehicle to limit the sharpness of the turn.

Most deflectors are vertically disposed barriers that deflect debris hurled toward the towed vehicle and as such, also act to increase the wind resistance of the caravan. The increased wind resistance decreases the fuel efficiency of the towing vehicle, thereby increasing the amount of fuel consumption and the cost of travel.

For the foregoing reasons there is a need for a tow shield device for protecting vehicles in tow that can be readily installed, removed, compacted and stored by the user. By attaching to the rear of the towed vehicle and to the front of the towed vehicle, the tow shield device of the present invention can effectively protect not only the front of the towed vehicle, but also the rear of the towing vehicle, as well as the tow bar and hitch from deflected debris and road grime.

SUMMARY

The present invention is a tow shield and underskirt device for protecting a vehicle that is being towed, the towing vehicle and tow bar. The tow shield device includes a deflecting member, means for supporting the deflecting member, means for attaching the deflecting member to the rear of a towing vehicle, and means for attaching the deflecting member to the front of a towed vehicle. The deflecting member comprises a flexible sheet. The means for supporting the deflecting member comprises a plurality of elastic members including a pair of longitudinal support members and a pair of transverse support members. The elasticity of the longitudinal support members enables them to lengthen and shorten, thereby accommodating relative movements that may occur between the two vehicles during travel.

The transverse support members are pre-tensioned and when installed, keep the forward and rearward edges of the tow shield device taut and in alignment with the respective towing and towed vehicles.

It is an object of the present invention to provide a tow shield device that protects a vehicle in tow from flying debris and road grime which may be deflected towards the vehicle during travel.

It is a further object of the present invention to provide a tow shield device that attaches to the rear of the towing vehicle and that attaches to the front of the towed vehicle.

It is a further object of the present invention to provide a tow shield device that can be readily installed without the use of tools.

It is a further object of the present invention to provide a tow shield device that can be folded or rolled into a compact configuration for storage.

It is a further object of the present invention to provide a tow shield device that protects the rear of the towing vehicle from deflected road debris and other airborne matter.

It is a further object of the present invention to provide a tow shield device that protects the tow bar and hitch from flying debris.

It is a further object of the present invention to provide a tow shield device that provides continuous protection to the towed vehicle when traveling through curves or turns.

It is a further object of the present invention to provide a tow shield device that does not impede the turning radius between the towing vehicle and the vehicle in tow.

It is a further object of the present invention to provide a tow shield device that protects the front of a towed vehicle, the tow hitch and the rear of the towing vehicle from flying debris, rocks, mud, snow, sand, tar, oil, engine exhaust, leaking hydraulic fluid, diesel soot, grease and water.

It is a further object of the present invention to provide a tow shield device that can be quickly installed and removed from the related vehicles.

It is a further object of the present invention to provide a tow shield device that deflects debris catapulted from the wheels of the towing vehicle.

It is a further object of the present invention to provide a tow shield device that can accommodate movement between the towing and towed vehicles, including changes in the distances between the vehicles when maneuvering around curves or corners.

It is a further object of the present invention to provide a tow shield device that is universally sized to fit various sizes and types of vehicles.

It is a further object of the present invention to provide a tow shield device having a generally horizontal profile to minimize the wind resistance of the caravan.

It is a further object of the present invention to provide a tow shield device that creates a minimal amount of wind resistance and allows for optimal fuel mileage.

The tow shield device of the present invention protects the front of the towed vehicle from flying debris and road grime. However, by attaching the device to the rear of the towing vehicle and to the front of the towed vehicle, it can effectively deter debris from striking not only the front of the vehicle in tow, but also the rear of the towing vehicle. Due to a preferred installation location beneath the hitch or tow bar, the tow shield device can also provide protection to the tow bar and hitch.

BRIEF DESCRIPTION OF THE DRAWINGS

These and other features, aspects and advantages of the present invention will become better understood with reference to the following descriptions, appended claims and accompanying drawings where:

DETAILED DESCRIPTION

Figure 1:
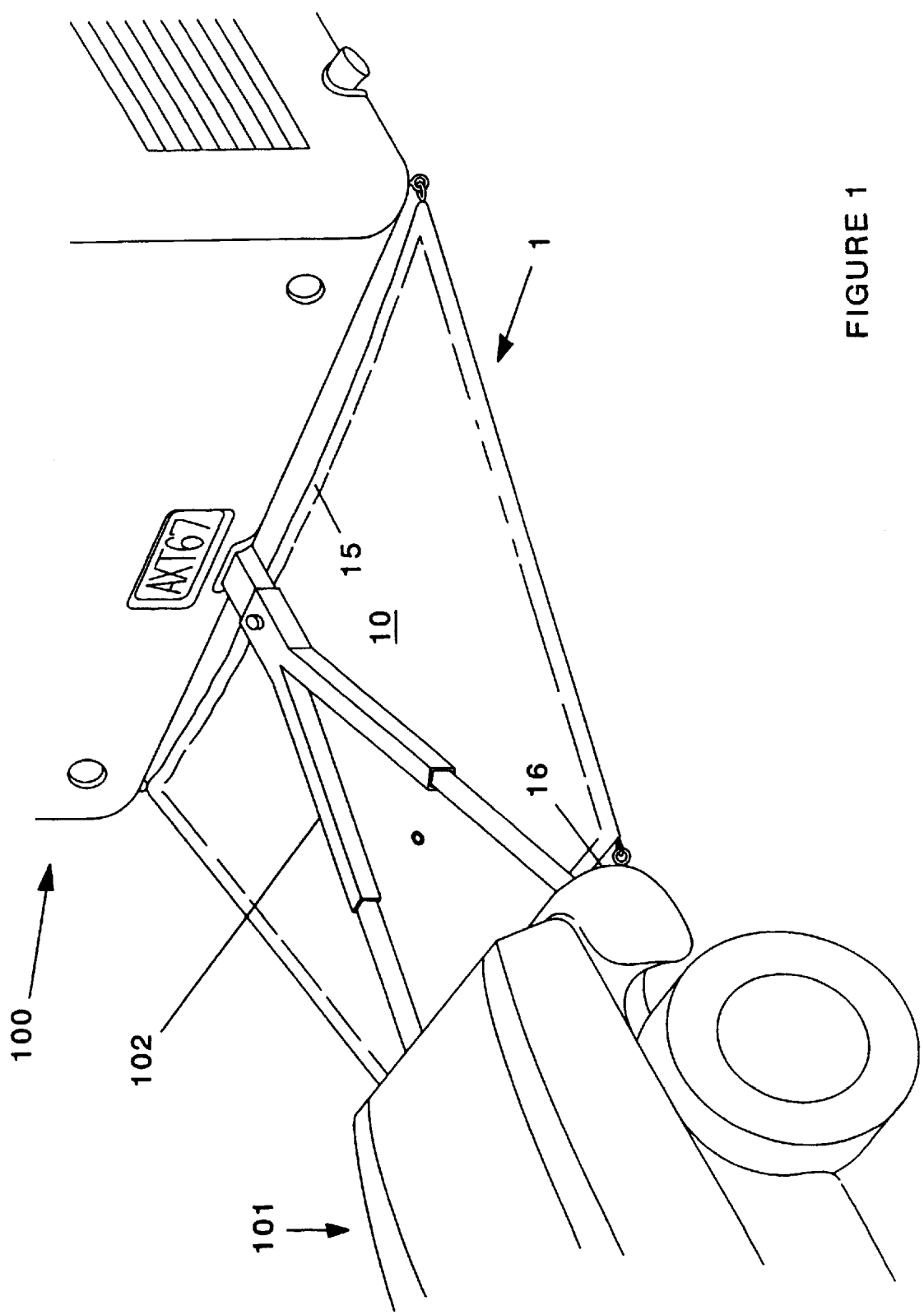
FIG. 1 is a top perspective view of a preferred embodiment of the tow shield device of the subject invention attached to the rear of an RV and to the front of a vehicle in tow.

Referring to FIG. 1, there is shown a preferred embodiment of the tow shield device (1) of the present invention attached to a towing vehicle (100) and a towed vehicle (101). The tow shield device (1) comprises a deflecting member (10) and a means for mounting the deflecting member.

The means for mounting the deflecting member (10) includes means for attaching the deflecting member to the towing vehicle (100), and means for attaching the deflecting member to the towed vehicle (101).

Figure 2:
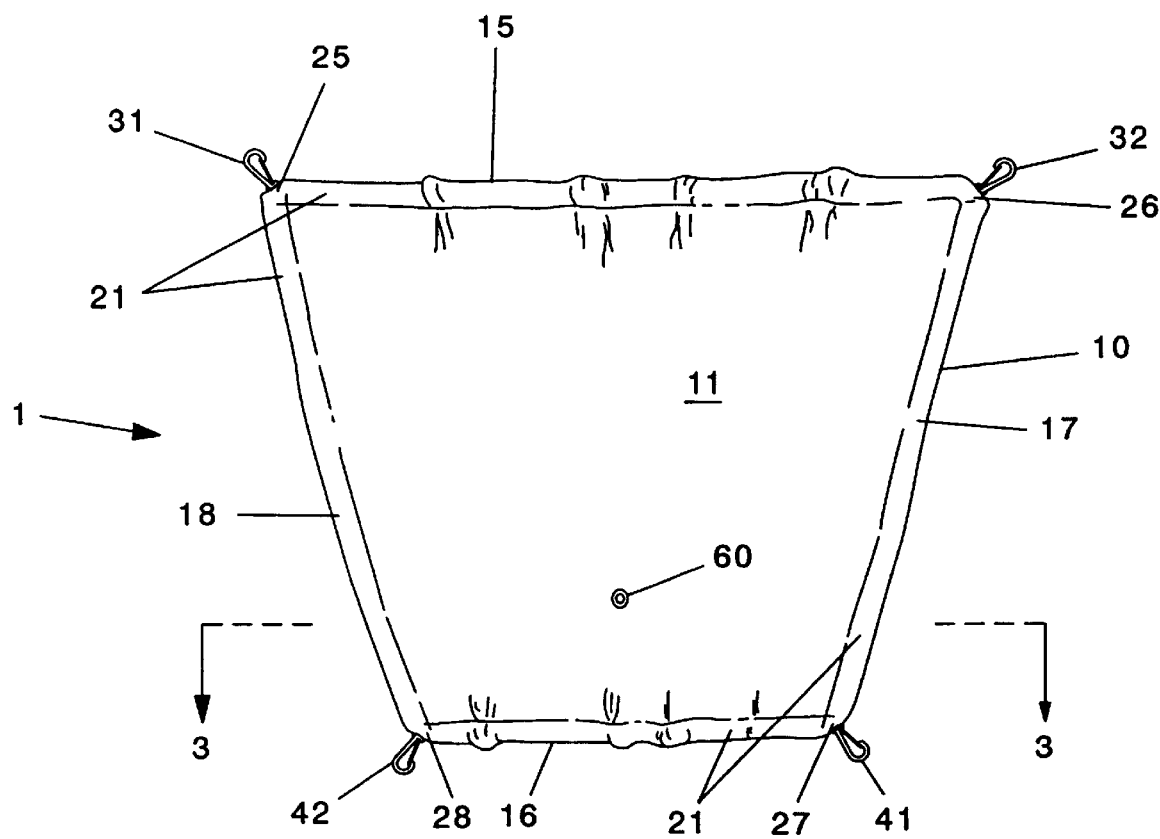
FIG. 2 is a top planar view of the tow shield device of FIG. 1.
Figure 3:
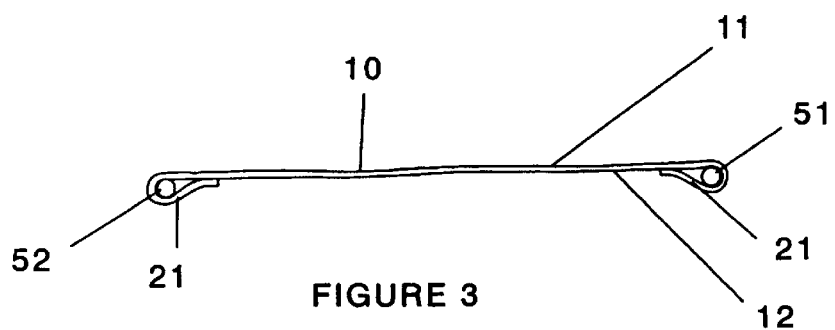
FIG. 3 is a cross sectional view of the tow shield device of FIG. 1 taken along line 3—3 in FIG. 2.
Figure 4:
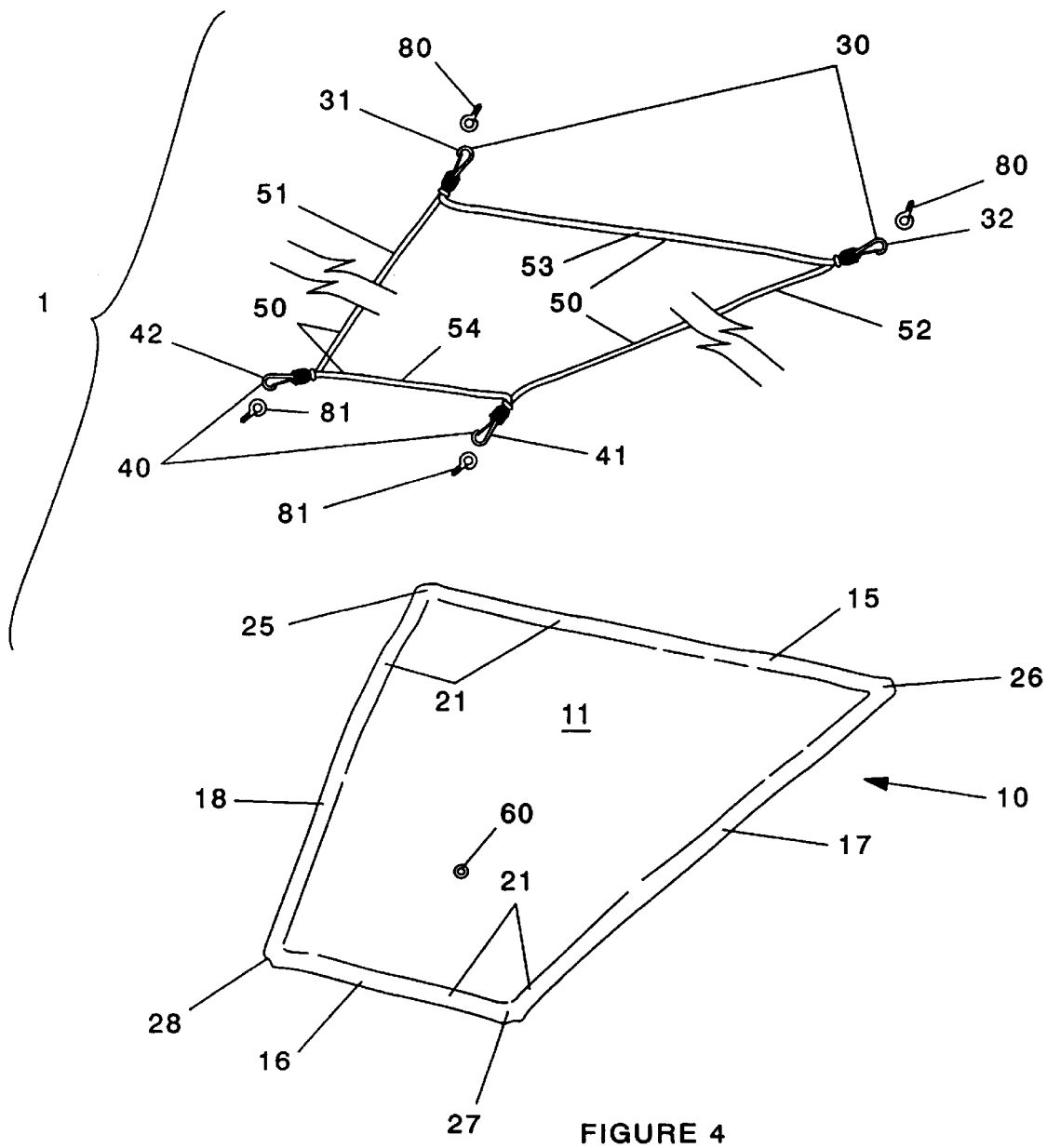
FIG. 4 is an exploded top perspective view of the tow shield device of FIG. 1, showing first and second receiving means.
Figure 5:
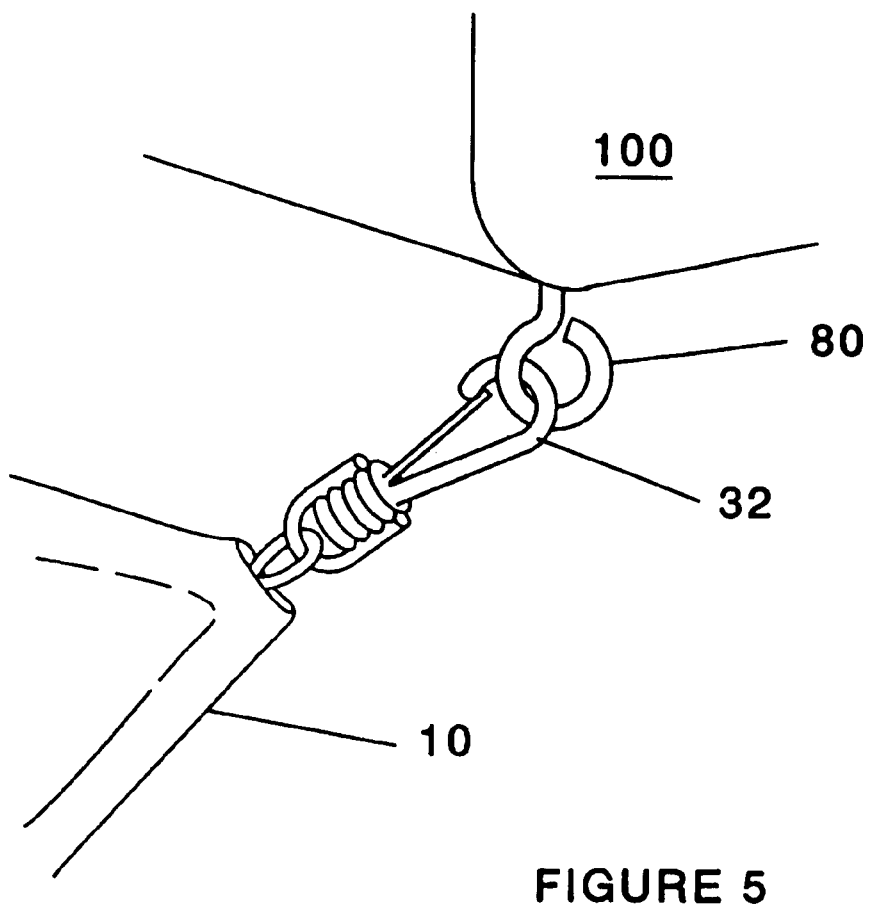
FIG. 5 is a detailed top perspective view of a portion of the tow shield device of FIG. 1, showing a snap hook attached to a receiving means secured on one of the vehicles.

In the preferred embodiment as shown in FIGS. 2–4, the means for attaching the deflecting member (10) to the towing vehicle (100) includes forward fasteners (30) comprising first (31) and second (32) snap hooks. The means for attaching the deflecting member (10) to the towed vehicle (101) includes rearward fasteners (40), which comprise third (41) and fourth (42) snap hooks. Although the forward (30) and rearward (40) fasteners are disclosed as comprising snap hooks, other types of fasteners including loops, snaps or clips could be used instead.

A plurality of elongated members (50) include a pair of longitudinal support members and a pair of transverse support members. The longitudinal support members comprise a left side support (51) and a right side support (52). The transverse support members include a forward side support (53) and a rearward side support (54).

Optionally, at least one aperture (60) can be provided on the deflecting member (10) as a means for draining the tow shield device (1). The at least one aperture (60) can be formed by a grommet extending through the deflecting member (10).

The deflecting member (10) is a sheet having a trapezoidal shape defined by a first edge (15), an opposing second edge (16), a third edge (17) between the first (15) and second (16) edges, and a fourth edge (18) opposite the third edge (17). The first (15) and second (16) edges are generally parallel to each other, with the first edge (15) being of a greater length than the second edge (16). The third (17) and fourth (18) edges are about the same length and extend nonparallel to each other.

It should be appreciated that other shapes can be used instead of a trapezoidal shape to form the sheet.

The sheet of the deflecting member (10) has an upper surface (11) and a lower surface (12). The member (10) is made from a tough, flexible material, such as canvas, plastic or reinforced plastic. Each of the elongated members are made of elastic cord that is durable enough to withstand repeated stretching and relaxing, yet strong enough to bear the weight of the deflecting member (10) when attached to the vehicles.

The sheet of the deflecting member (10), as shown in FIG. 1, intercepts and deflects debris away from the vehicles (100, 101) and the tow bar (102). The means for mounting the deflecting member secures the deflecting member (10) in place on the towing vehicle (100) and the towed vehicle (101).

Referring to FIGS. 1 and 4, the forward side support (53) is pre-tensioned. Therefore, when the tow shield device (1) is installed the first edge (15) of the deflecting member (10) remains taut and in alignment with the rear of the towing vehicle (100). Likewise, the rearward sheet support (54) is pre-tensioned, and, after installation, holds the second edge (16) of the deflecting member (10) taut and aligned with the front of the towed vehicle. The tension maintained in the transverse support members after installation also keeps the first (15) and second (16) edges from sagging. This deters undesirable gaps from forming between the deflecting member (10) and the vehicles which would allow debris and grime to reach the vehicles.

The longitudinal support members hold the third (17) and fourth (18) edges of the deflecting member (10) in place. Since they are elastic, the longitudinal support members can stretch and relax to lengthen and shorten, respectively, in response to relative movements between the towed vehicle (101) and the towing vehicle (100), including changes in the distances between the two vehicles. The latter occurs when rounding a corner or driving on curved roads. In a curve, the distance between the rear of the towing vehicle (100) and the front of the towed vehicle (101) is greater on one side of the vehicles than it is on the other side of the vehicles.

For example, when making a left turn using the present invention, the right side support (52) stretches and lengthens to adjust to the increasing distance occurring on the right side of the vehicles as the towing vehicle goes into the curve. Meanwhile, the left side support (51) relaxes as the distance between the vehicles decreases on the left side. By relaxing, the left side support (51) picks up slack in the corresponding fourth edge (18) of the deflector. As the towed vehicle (101) realigns with the towing vehicle (100), both longitudinal support members return to approximately equal lengths. It should be recognized that the converse occurs when making a right turn.

The magnitude of changes in the distances, and therefore the change in the length of the respective longitudinal support members, is dependent on the sharpness of the curve. Nonetheless, the longitudinal support members can stretch and relax to change lengths in order to accommodate the relative movement between the vehicles.

The aperture (60) in the sheet discourages appreciable amounts of moisture from collecting on the upper surface (11) of the deflecting member (10) by providing a passageway through which the moisture can drain.

Still referring to FIG. 4, the first edge (15) of the deflecting member (10) has a casing (21). The forward side support (53) extends through the casing (21) and each end thereof is positioned near a respective first (25) and second (26) corner of the deflecting member (10). Similarly, the second edge (16) of the deflecting member (10) has a casing (21) that receives the rearward side support (54) therethrough. The respective ends of the rearward side support (54) are positioned near the third (27) and fourth (28) corners of the deflecting member (10).

The forward (53) and rearward (54) side supports are pre-tensioned within the casings (21) along their respective first (15) and second (16) edges of the deflecting member (10). To pretension the transverse support members, the relaxed lengths of the forward (53) and rearward (54) side supports are made shorter than the respective lengths of the first (15) and second (16) edges of the deflection member (10). Prior to installment, the forward and rearward side supports (53, 54) can relax somewhat, creating a gathering effect along the corresponding first (15) and second (16) edges as shown in FIG. 2. However, when the deflecting member (10) is installed, the transverse support members are stretched and hold the forward (53) and rearward (54) side supports and the corresponding first (15) and second (16) edges taut.

The first (31), second (32), third (41) and fourth (42) snap hooks are disposed at respective first (25), second (26), third (27) and fourth (28) corners of the deflecting member (10). In the preferred embodiment as shown in FIG. 4, the elongated members (50) are comprised of a single elastic cord formed into a closed loop with the snap hooks (31, 32, 41, 42) attached at spaced positions along the cord, thereby defining the longitudinal support members and the transverse support members. However, the elongated members could be formed as discrete elements.

The tow shield device (1) is universally sized to fit most vehicles. Nonetheless, the tow shield device (1) could be custom manufactured to fit particular sized vehicles, if desired.

The first (31) and second (32) snap hooks provide the means for attaching the deflecting member to the towing vehicle. Both snap hooks (31,32) are adapted for releasable attachment to a first receiving means that is adapted for attachment to the towing vehicle (100). Preferably, the first receiving means comprises a pair of eyebolts (80) which is attached to a lower surface of the rear bumper or the rear fender of the leading vehicle. The eyebolts (80) are preferably spaced apart from each other a maximum distance allowed by the width of the vehicle.

The third (41) and fourth (42) snap hooks of the rearward fasteners engage a second receiving means that is adapted for attachment to the towed vehicle. The second receiving means preferably comprises a pair of eyebolts (81) that is secured to a lower surface on the front bumper or fender of the trailing vehicle. The eyebolts (81) are disposed on opposite sides of the vehicle, and preferably spaced apart from each other a maximum allowable distance.

Although the first and second receiving means disclosed herein comprise eyebolts, it should be appreciated that other receiving means cooperating with the forward and rearward fasteners could be used instead.

When installed, the tow shield device (1) of the present invention extends between the two vehicles and beneath the tow bar (102) at a distance from the ground, as shown in FIG. 1. As a result, road debris or other flying particles that are propelled towards the vehicles and the tow bar and hitch during transit are intercepted and deflected away therefrom by the deflecting member (10). Therefore, the tow shield device (1) acts as a deflector to protect the vehicles and tow bar and hitch.

To install the tow shield device (1), the first edge (15) is aligned with the rearward side of the towing vehicle. Stretching the forward side support (53), the first (31) and second (32) snap hooks are secured to respective eyebolts (80) on the towing vehicle (100).

The sheet of the deflecting member (10) is drawn beneath the tow bar (102) and the second edge (16) of the tow shield device (1) is aligned with the front side of the towed vehicle (101). The rearward side support (54) is stretched as the third (41) and fourth (42) snap hooks of the device are fastened to the respective eyebolts (81) on the towed vehicle (101).

Both the forward (53) and rearward (54) side supports are held in tension by the receiving means on each vehicle, with the first (15) and second (16) edges of the deflector (10) pulled taut. The forward (30) and rearward (40) fasteners can be attached to the respective receiving means in any order desired.

If desired, the first (15) and second (16) edges can be reversed upon installation, wherein the longer, first edge (15) of the sheet is attached to the towed vehicle and the shorter second edge (16) is attached to the rear of the towing vehicle. This arrangement would be preferable when the vehicle in tow is wider than the towing vehicle.

Alternately, the tow shield device (1) can be positioned over the tow bar and hitch, then secured to the respective vehicles as described above. However, it should be recognized that with such an arrangement the tow bar (102) would not be protected by the tow shield device (1).

The tow shield device (1) is removed from the vehicles by detaching the snap hooks (31, 32, 41, 42) from the respective eyebolts (80, 81) to which they are coupled.

Figure 6:
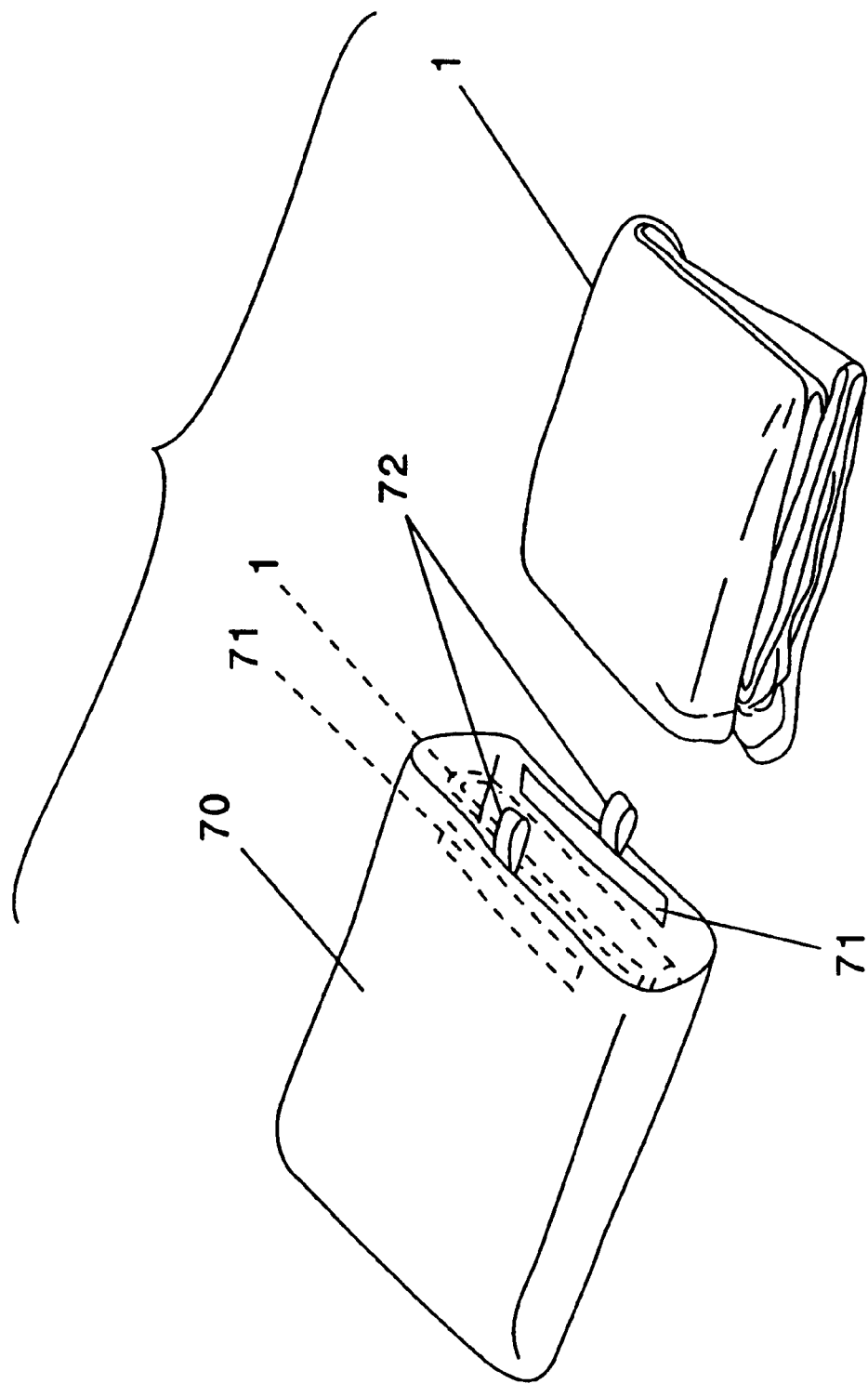
FIG. 6 is a top perspective view of the tow shield device of FIG. 1 in a compact configuration shown in solid lines outside of a storage bag and in dotted lines disposed within the bag.

Once removed, the device can be folded and/or rolled into a compact configuration for storing. As shown in FIG. 6, in a compact configuration, the tow shield device (1) can be placed in a storage bag (70). The storage bag (70) can include a hook and loop type fastener (71) and pair of handle straps (72).

The tow shield device extends from the rear of the towing vehicle to the front end of the towed vehicle, thereby intercepting and deflecting debris propelled toward the two vehicles. With the deflecting member positioned between the vehicles and generally horizontal to the ground, the wind resistance of the caravan is minimized thereby minimizing fuel consumption.

The transverse support members are pre-tensioned to ensure that the deflecting member remains in proper position after installation. The forward and rearward side supports keep the first and second edges of the deflecting member taut to avoid sagging and a resultant formation of undesirable gaps between the deflecting member and the vehicles.

Due to their elasticity, the longitudinal support members can lengthen and shorten in response to varying distances between the vehicles when driving around corners or along curved roads. The longitudinal support members continually adjust in length to hold the tow shield device in place and thereby maintain continuous protection from debris.

The flexibility of the deflecting member and the elasticity of the longitudinal support members combine to allow a full turning radius in which to maneuver the towing and towed vehicles without damaging the tow shield device or the vehicles.

The tow shield device can be easily and quickly installed and removed as needed. In addition, the device can be folded and/or rolled into a compact configuration and placed in a storage bag for convenience.

Although the present invention has been described in considerable detail with reference to certain preferred versions thereof, other versions are possible. Therefore, the spirit and scope of the appended claims should not be limited to the description of the preferred versions contained herein.

What is claimed is:

1. A tow shield device for protecting the towed vehicle from deflected debris and other deflected objects during travel, said tow shield device comprising:

a deflecting member;

means for mounting the deflecting member; and at least two longitudinal elastic support members for supporting the deflecting member;

wherein said deflecting member is a sheet of flexible material having a first, second, third, and fourth edges, wherein said first and second edges are disposed opposite to each other, and said third and fourth edges are disposed opposite to each other; and said at least two longitudinal elastic support members include a right side support and a left side support, wherein said right side support is disposed along the third edge and said left side support is disposed along said fourth edge.

2. The tow shield device of claim 1, wherein said third and fourth edges comprise casings therealong, and said right and left side supports extending through the casings along said third and fourth edges, respectively.

3. The tow shield device of claim 1, wherein said sheet further comprises first, second, third and fourth corners, said third and fourth edges comprise casings therealong; and wherein said right side support has ends positioned near said second and third corners and extends through said casing along said third edge, said left side support has ends positioned near said fourth and first corners and extends through said casing along said fourth edge.

4. A tow shield device for protecting the towed vehicle from deflected debris and other deflected objects during travel, said tow shield device comprising:

a deflecting member;

means for mounting the deflecting member; and means for supporting the deflecting member including elastic members;

wherein said elastic members comprise at least two transverse support members.

5. The tow shield device of claim 4, wherein said deflecting member is a sheet of flexible material having a first, second, third, and fourth edges, wherein said first and second edges are disposed opposite each other, and said third and fourth edges are disposed opposite each other; and said transverse support members include a forward side support and a rearward side support, wherein said forward side support is disposed along the first edge, said rearward side support is disposed along said second edge, and said forward and rearward side supports are pre-tensioned.

6. The tow shield device of claim 5, wherein said first and second edges comprise casings therealong, and said forward and rearward side supports extend through the casings along said first and second edges, respectively.

7. The tow shield device of claim 5, wherein said sheet further comprises first, second, third and fourth corners, said first and second edges comprise casings therealong; and wherein said forward side support has ends positioned near said first and second corners and extends through said casing along said first edge, said rearward side support has ends positioned near said third and fourth corners and extends through said casing along said second edge.

8. A tow shield device for attachment to a towing vehicle and a towed vehicle, said tow shield device comprising:

a deflecting member;

forward fasteners adapted to attach the deflecting member to the towing vehicle; and rearward fasteners adapted to attach the deflecting member to the towed vehicle;

wherein said deflecting member comprises a sheet of flexible material having a plurality of edges; and a plurality of elastic members extending along at least two edges of said deflecting member.

9. The tow shield device of claim 8, wherein said deflecting member comprises a first corner, a second corner, a third corner and a fourth corner, said forward fasteners are positioned near the first and second corners of the deflecting member, and said rearward fasteners are positioned near the third and fourth corners of the deflecting member.

10. The tow shield device of claim 9, wherein said forward fasteners comprise first and second snap hooks, and said rearward fasteners comprise third and fourth snap hooks.

11. The tow shield device of claim 8, wherein said plurality of elastic members extending along each of said plurality of edges of said deflecting member.

12. A tow shield device for protecting a towed vehicle from debris and other deflected objects, said tow shield device comprising:

a deflecting member;

a plurality of fasteners for mounting the deflecting member;

a pair of longitudinal support members; and a forward side support and a rearward side support;

wherein said longitudinal support members, said forward side support and said rearward side support are elastic.

13. The tow shield device of claim 12, wherein at least one of said forward side support and rearward side support is pre-tensioned.

14. A tow shield device for protecting a towed vehicle from debris and other deflected objects, said tow shield device comprising:

a deflecting member;

a plurality of fasteners for mounting the deflecting member;

a pair of longitudinal support members; and a forward side support and a rearward side support;

wherein said longitudinal support members are elastic and said deflecting member is a sheet of flexible material having a first, second, third, and fourth edges, wherein said first and second edges are disposed opposite to each other, and said third and fourth edges are disposed opposite to each other;

said forward side support is disposed along the first edge and said rearward side support is disposed along said second edge; and said longitudinal support members include a right side support and a left side support, wherein said right side support is disposed along said third edge and said left side support is disposed along said fourth edge.

15. The tow shield device of claim 14, wherein said first, second, third and fourth edges each comprise a casing therealong, and said forward and rearward side supports extend through the casings along said first and second edges, respectively, and said right and left side supports extend through the casings along said third and fourth edges, respectively.

16. The tow shield device of claim 15, wherein said sheet of the deflecting member further comprises first, second, third and fourth corners;

said forward side support has ends positioned near said first and second corners and extends through said casing along the first edge;

said rearward side support has ends positioned near said third and fourth corners and extends through said casing along said second edge;

said right side support has ends positioned near said second and third corners and extends through said casing along the third edge; and said left side support has ends positioned near said fourth and first corners and extends through said casing along said fourth edge.

17. A tow shield device for attachment to a towing vehicle and a towed vehicle and for protecting the towed vehicle, the towing vehicle and towing hitch from deflected debris and other deflected objects thrown during travel, said tow shield device comprising:

a deflecting member comprising a sheet of flexible material having first and second edges adjoined by third and fourth edges, wherein said first and second edges being disposed opposite to each other and said third and fourth edges being disposed opposite to each other, said first and fourth edges adjoining at a first corner of the sheet, said first and third edges adjoining at a second corner of the sheet, said second and third edges adjoining at a third corner of the sheet, and said second and fourth edges adjoining at a fourth corner of the sheet;

said deflecting member further including upper and lower surfaces, a casing along said first edge, a casing along said second edge, a casing along said third edge and a casing along said fourth edge;

means for mounting the deflecting member which comprises: (a) means for attaching the deflecting member to a towing vehicle comprising forward fasteners which include first and second snap hooks, wherein said first snap hook is positioned near said first corner of the sheet, and said second snap hook is positioned near said second corner of the sheet; and (b) means for attaching the deflecting member to a towed vehicle comprising rearward fasteners which include third and fourth snap hooks, wherein said third snap hook is positioned near the third corner of the sheet and said fourth snap hook is positioned near the fourth corner of the sheet;

means for supporting the deflecting member which includes a pair of longitudinal support members and a pair of transverse support members; said longitudinal support members further comprising a right side support and a left side support, and said transverse support members further comprising a forward side support and a rearward side support, wherein said left and right side supports and said forward and rearward side supports are elastic;

said right side support extends through said casing along the third edge of the deflecting member and has ends positioned near the second and third corners, said left side support extends through said casing along the fourth edge of the deflecting member and has ends positioned near said first and fourth corners;

said forward side support extends through said casing along said first edge of the deflecting member and has ends positioned near the first and second corners, and said rearward side support extends through said casing along said second edge and has ends positioned near the third and fourth corners of the deflecting member, wherein said forward and rearward side supports being pre-tensioned within the respective casings on the deflecting member;

wherein said deflecting member is positioned between the vehicles.

18. The tow shield device of claim 17, further comprising means for draining the deflecting member comprising at least one aperture spaced inwardly from the edges.

19. The tow shield device of claim 18, further comprising first and second receiving means, wherein said tow shield device is attached to the towed vehicle and to the towing vehicle, the first and second snap hooks are adapted to engage first receiving means which is secured to the towing vehicle, and said third and fourth snap hooks are adapted to engage second receiving means which is secured to the towed vehicle, said forward and rearward side supports are adapted to be held in tension on said first and second receiving means.

20. The tow shield device of claim 19, further comprising a storage bag for housing the tow shield device when said tow shield device is in a compacted configuration.

21. The tow shield device of claim 17, wherein said receiving means comprises eyebolts.

22. The tow shield device of claim 17, wherein said sheet is trapezoidally shaped with said first edge having a length greater than said second edge.

* * * * *